(12) United States Patent
Peled (10) Patent No.: US 8,949,475 B2
(45) Date of Patent: Feb. 3, 2015

(54) EFFICIENT CONNECTION MANAGEMENT IN A SAS TARGET

(71) Applicant: Apple Inc., Cupertino, CA (US)

(72) Inventor: Arie Peled, Tel-Mond (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/217,802

(22) Filed: Mar. 18, 2014

(65) Prior Publication Data

US 2014/0201391 A1 Jul. 17, 2014

Related U.S. Application Data

(62) Division of application No. 13/439,860, filed on Apr. 5, 2012, now Pat. No. 8,719,457.

(60) Provisional application No. 61/476,287, filed on Apr. 17, 2011, provisional application No. 61/528,771, filed on Aug. 30, 2011.

(51) Int. Cl.
*G06F 3/00* (2006.01)
*G06F 3/06* (2006.01)
*G11B 5/09* (2006.01)

(52) U.S. Cl.
CPC ............. *G06F 3/0661* (2013.01); *G11B 5/09* (2013.01); *G06F 3/0617* (2013.01); *G06F 3/068* (2013.01); *G06F 3/0611* (2013.01); *G06F 3/0655* (2013.01); *G06F 3/0689* (2013.01)
USPC ............................................. 710/5; 712/228

(58) Field of Classification Search
None
See application file for complete search history.

(56) References Cited

U.S. PATENT DOCUMENTS

| 7,536,584 | B2 | 5/2009 | Davies |
| 8,140,696 | B2 | 3/2012 | Ko |
| 8,214,540 | B2 * | 7/2012 | Okaue et al. ...................... 710/5 |
| 8,239,662 | B1 * | 8/2012 | Nelson .............................. 713/1 |
| 8,255,607 | B2 | 8/2012 | Jones |
| 8,341,374 | B2 | 12/2012 | Kwon |
| 8,434,131 | B2 | 4/2013 | Varadharajan |
| 8,458,381 | B2 | 6/2013 | Holty |
| 8,583,992 | B2 | 11/2013 | Cho |
| 2005/0129602 | A1 * | 6/2005 | Takahashi et al. ............ 423/274 |
| 2006/0041699 | A1 * | 2/2006 | Day et al. ...................... 710/106 |
| 2011/0138116 | A1 | 6/2011 | Lipinski |
| 2012/0110291 | A1 * | 5/2012 | Zilber et al. .................. 711/163 |
| 2012/0265903 | A1 * | 10/2012 | Peled ............................... 710/5 |

* cited by examiner

*Primary Examiner* — Elias Mamo
(74) *Attorney, Agent, or Firm* — Meyertons, Hood, Kivlin, Kowert & Goetzel, P.C.

(57) ABSTRACT

A method includes pre-configuring a hardware-implemented front-end of a storage device with multiple contexts of respective connections conducted between one or more hosts and the storage device. Storage commands, which are received in the storage device and are associated with the connections having the pre-configured contexts, are executed in a memory of the storage device using the hardware-implemented front-end. Upon identifying a storage command associated with a context that is not pre-configured in the hardware-implemented front-end, software of the storage device is triggered to configure the context in the hardware-implemented front-end, and the storage command is then executed using the hardware-implemented front-end in accordance with the context configured by the software.

10 Claims, 3 Drawing Sheets

EFFICIENT CONNECTION MANAGEMENT IN A SAS TARGET

CROSS-REFERENCE TO RELATED APPLICATIONS

This application is a divisional of U.S. patent application Ser. No. 13/439,860, filed Apr. 5, 2012, which claims the benefit of U.S. Provisional Patent Application 61/476,287, filed Apr. 17, 2011, and U.S. Provisional Patent Application 61/528,771, filed Aug. 30, 2011, whose disclosures are incorporated herein by reference.

FIELD OF THE INVENTION

The present invention relates generally to data storage, and particularly to methods and systems for enhanced data storage using serial storage protocols.

BACKGROUND OF THE INVENTION

Data storage devices, such as Solid State Drives (SSDs) and enterprise storage systems, use various storage protocols for transferring data to and from storage. Two examples of storage protocols are the Small Computer System Interface (SCSI) and the Serial Attached SCSI (SAS) protocols, both developed by the International Committee for Information Technology Standards (INCITS).

The SCSI protocol is described, for example, in "Information Technology—SCSI Architecture Model-5 (SAM-5)," INCITS document T10/2104-D, revision 01, Jan. 28, 2009, which is incorporated herein by reference. The SAS protocol is described, for example, in "Information Technology—Serial Attached SCSI-2 (SAS-2)," INCITS document T10/1760-D, revision 15a, Feb. 22, 2009, which is incorporated herein by reference.

SUMMARY OF THE INVENTION

An embodiment of the present invention that is described herein provides a method for data storage. The method includes pre-configuring a hardware-implemented front-end of a storage device with multiple contexts of respective connections conducted between one or more hosts and the storage device. Storage commands, which are received in the storage device and are associated with the connections having the pre-configured contexts, are executed in a memory of the storage device using the hardware-implemented front-end. Upon identifying a storage command associated with a context that is not pre-configured in the hardware-implemented front-end, software of the storage device is triggered to configure the context in the hardware-implemented front-end, and the storage command is then executed using the hardware-implemented front-end in accordance with the context configured by the software.

In some embodiments, the storage commands are received in accordance with a Serial Attached Storage (SAS) storage protocol. In an embodiment, the storage device includes a Solid State Disk (SSD). In a disclosed embodiment, triggering the software includes issuing an interrupt to a Central Processing Unit (CPU) that runs the software. In another embodiment, triggering the software includes causing the software to replace a previously-configured context in the hardware-implemented front-end with the context associated with the identified storage command. In yet another embodiment, executing the storage commands includes carrying out the storage commands without involvement of the CPU.

There is additionally provided, in accordance with an embodiment of the present invention, a data storage apparatus including a CPU and a hardware-implemented front-end. The hardware-implemented front-end is pre-configured with multiple contexts of respective connections conducted between one or more hosts and the apparatus, and is arranged to execute in a memory of the apparatus storage commands that are received in the apparatus and are associated with the connections having the pre-configured contexts, and, upon identifying a storage command associated with a context that is not pre-configured in the hardware-implemented front-end, to trigger software running in the CPU to configure the context in the hardware-implemented front-end, and then to execute the storage command in accordance with the context configured by the software.

There is also provided, in accordance with an embodiment of the present invention, a method for data storage. The method includes, in a hardware-implemented front-end of a storage device, opening at least one connection, executing in a memory of the storage device storage commands associated with at least one connection, closing the at least one connection after executing the storage commands, and caching one or more contexts of respective one or more connections that were most recently closed. A storage command associated with a given connection that is not currently open is received. The given connection is checked against the cached contexts. Upon identifying that the given connection is one of the one or more connections that were most recently closed, the given connection is re-opened using one of the cached contexts and the storage command is executed using the hardware-implemented front-end in accordance with the one of the contexts.

In some embodiments, the storage commands are received in accordance with a SAS storage protocol. In an embodiment, the storage device includes a SSD. In a disclosed embodiment, closing the at least one connection includes closing each connection following a predefined inactivity period on the connection. In another embodiment, executing the storage commands includes carrying out the storage commands without involvement of a CPU of the storage device.

There is further provided, in accordance with an embodiment of the present invention, a data storage apparatus including an interface and a hardware-implemented front-end. The interface is arranged to communicate with one or more hosts. The hardware-implemented front-end is arranged to open at least one connection, to execute in a memory of the apparatus storage commands associated with the at least one connection, to close the at least one connection after executing the storage commands, to cache one or more contexts of respective one or more connections that were most recently closed, to receive a storage command associated with a given connection that is not currently open, to check the given connection against the cached contexts, and, upon identifying that the given connection is one of the one or more connections that were most recently closed, to re-open the given connection using one of the cached contexts and to execute the storage command in accordance with the one of the cached contexts.

There is also provided, in accordance with an embodiment of the present invention, a method for data storage in a storage device that communicates with a host over a storage interface for executing a storage command in a memory of the storage device. The method includes estimating an expected data under-run between fetching data for the storage command from the memory and sending the data over the storage interface. A data size to be prefetched from the memory, in order to complete uninterrupted execution of the storage command, is calculated in the storage device based on the estimated data under-run. The storage command is executed in the memory while prefetching from the memory data of at least the calculated data size.

In some embodiments, the storage command is received in accordance with a SAS storage protocol. In some embodiments, the storage device includes a SSD. In an embodiment, executing the storage command includes transferring the data from the storage device to the host, and calculating the data size includes determining the minimal data size that causes the data to be transferred in successive time slots.

In another embodiment, executing the storage command includes transferring the data from the storage device to the host, and the method includes re-transmitting the data to the host upon a failure to transfer the data successfully using the calculated data size. In an embodiment, calculating the data size includes setting the data size depending on a type of the memory from which the data is fetched.

There is additionally provided, in accordance with an embodiment of the present invention, a data storage apparatus including an interface and storage circuitry. The interface is arranged to communicate with a host over a storage interface for executing a storage command in a memory of the apparatus. The storage circuitry is arranged to estimate an expected data under-run between fetching data for the storage command from the memory and sending the data over the storage interface, to calculate, based on the estimated data under-run, a data size to be prefetched from the memory in order to complete uninterrupted execution of the storage command, and to execute the storage command in the memory while prefetching from the memory data of at least the calculated data size.

There is also provided, in accordance with an embodiment of the present invention, a method for data storage in a storage device that executes storage commands in a memory of the storage device. The method includes maintaining a hash table that stores tags of active connections and is accessed by hash values that are produced by applying a hash function to the tags extracted from received storage commands, wherein the hash table includes entries holding one or more of the tags associated with the respective hash values. A storage command, which is associated with a new connection and includes a tag of the new connection, is received in the storage device. The hash function is applied to the tag so as to produce a hash value. A lookup is performed in the hash table using the hash value. Upon detecting that the tag of the new connection matches one of the tags in an entry of the hash table associated with the hash value, an indication is output that the new connection has a duplicate tag with an existing active connection.

In some embodiments, the storage command and the connection conform to a SAS storage protocol. In some embodiments, the storage device includes a SSD. In an embodiment, each of the entries in the hash table holds no more than a predefined number, N, of the tags, and the method includes declining the new connection upon detecting that all the N tags in the entry associated with the hash value are already occupied. In another embodiment, declining the new connection includes sending a declination message to a host that initiated the storage command. Sending the declination message may include sending a SAS "task set full" message.

There is further provided, in accordance with an embodiment of the present invention, a data storage apparatus including an interface and storage circuitry. The interface is arranged to receive storage commands for execution in a memory of the apparatus. The storage circuitry is arranged to maintain a hash table that stores tags of active connections and is accessed by hash values produced by applying a hash function to the tags extracted from received storage commands, wherein the hash table includes entries holding one or more of the tags associated with the respective hash values, to receive via the interface a storage command that is associated with a new connection and includes a tag of the new connection, to apply the hash function to the tag so as to produce a hash value, to perform a lookup in the hash table using the hash value, and, upon detecting that the tag of the new connection matches one of the tags in an entry of the hash table associated with the hash value, to output an indication that the new connection has a duplicate tag with an existing active connection.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for carrying out storage commands using storage protocols such as SAS. In accordance with the SAS protocol, each storage command belongs to a connection that is opened between the storage device and a host.

In some embodiments, a storage device comprises a hardware-implemented front-end and a Central Processing Unit (CPU), which jointly execute storage commands in a memory. In a Solid State Disk (SSD) application, for example, the hardware front-end and the CPU are embodied in an SSD controller, and the memory comprises multiple Flash memory devices.

In some disclosed embodiments, the CPU pre-configures the hardware front-end with multiple contexts that define operational parameters of respective connections. The hardware front-end executes storage commands belonging to these connections autonomously, using the pre-configured contexts, without involving the CPU software. If, however, the hardware front-end identifies a storage command whose context is not pre-configured, it triggers the CPU software to configure the context of this connection in the hardware front-end, and then executes the command using the configured context.

This technique enables the storage device to execute the majority of storage commands purely in hardware, without a need to re-configure the hardware front-end on every command. As a result, processing latency in the storage device can be reduced and storage throughput can be increased considerably. At the same time, the storage device is not limited in the total number of simultaneously-supported connections: Connections that are not pre-configured in the hardware front-end can be configured by the CPU as needed, although they will typically exhibit higher latency.

In other disclosed embodiments, the hardware front-end caches the contexts of one or more most-recently-used connections, even after the connections are closed. When receiving a subsequent storage command, the hardware front-end checks whether this command belongs to one of the connections that were most recently closed. If so, the hardware front-end re-opens the connection using the cached context, and executes the command, without having to involve the CPU. In some scenarios, this technique reduces the computational and latency overhead associated with opening of connections, and therefore increases storage throughput, while imposing only modest hardware requirements.

Other embodiments that are described herein compensate for temporary data under-runs that may occur in the storage interface (e.g., SAS interface). Unless accounted for, such temporary data under-run may cause pauses or gaps in the transfer of data frames—which are not permitted in the SAS protocol. In some embodiments, the storage device estimates the expected data under-run, and calculates a data size that is to be prefetched from the memory in order to complete uninterrupted execution of storage commands. The storage device then executes storage commands while prefetching at least the calculated data size.

In accordance with the SAS protocol, each connection is assigned a tag, and the tags of active (open) connections must differ from one another at any given time. Duplicate tags, i.e., different connections assigned the same tag, are regarded as a failure event. Some disclosed embodiments use a hash table mechanism in the storage device for detecting duplicate tags.

In these embodiments, the storage device stores tags of currently-active connections in a hash table. The table is accessed by hash values that are produced by applying a hash function to the tags extracted from received storage commands. Each entry of the hash table holds one or more tags associated with a respective hash value. When a new connection is opened, the storage device adds the tag of the new connection to the appropriate entry of the hash table, i.e., to the entry associated with the hash value produced from the tag assigned to the new connection.

In some embodiments, the storage device detects duplicate tags by comparing the tag of the new connection to the tags that are already stored in the corresponding entry of the hash table. If a match is found, the storage device reports an error message indicating the duplicate tag.

In some embodiments, each hash table entry is limited in size to hold no more than a predefined number, N, of tag values. If, when checking the tag of a new connection, the storage device finds that the corresponding hash table entry is already fully-populated with N tag values, the storage device declines the new connection. The storage device may decline the connection, for example, by sending a "task set full" SAS message to the host. This technique enables the storage device to avoid duplicate tag scenarios using a manageable-size hash table.

System Description

Figure 1:
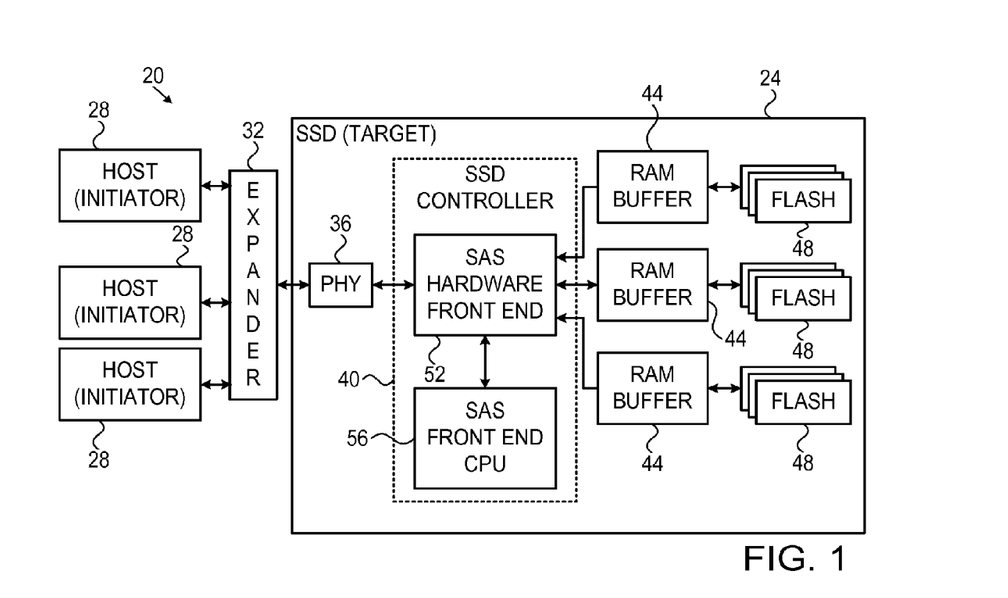
FIG. 1 is a block diagram that schematically illustrates a data storage system, in accordance with an embodiment of the present invention.

FIG. 1 is a block diagram that schematically illustrates a data storage system 20, in accordance with an embodiment of the present invention. System 20 comprises a storage device, in the present example a Solid state Drive (SSD) 24, which stores data on behalf of one or more hosts 28. System 20 may comprise, for example, an enterprise storage system comprising multiple SSDs 24, a computing device such as a notebook or laptop computer, or any other suitable system.

In the present embodiment SSD 24 communicates with hosts 28 using the Serial Attached SCSI (SAS) protocol, cited above. In SAS terminology, the storage device is referred to as a target and the hosts are referred to as initiators. The embodiment of FIG. 1 shows a single storage device (target) that communicates with three hosts (initiators) via an expander 32.

In alternative embodiments, system 20 may comprise any desired number of storage devices of any suitable kind, which communicate with any desired number of hosts using any suitable storage protocol. Some of the disclosed techniques may be applied, for example, in alternative storage protocols such as Serial Advanced Technology Attachment (SATA) or NVM express. Although the embodiments refer mainly to serial storage protocols such as SAS, some of the disclosed techniques can also be used in parallel storage protocols, as well.

SSD 24 comprises a physical layer unit (PHY) 36, which functions as an interface between the SSD and the hosts and applies various physical-layer functions such as serial-to-parallel conversion. An SSD controller 40 manages the operation of SSD 24. In particular, the SSD controller stores and retrieves data in multiple non-volatile memory devices, such as Flash memory devices 48. In the present example, the data exchanged between the SSD controller and the Flash memory devices is buffered in one or more Random Access Memory (RAM) buffers 44.

Typically, SSD 24 receives from each host 28 memory access commands, e.g., read and write commands, and executes the commands in memory devices 48. In accordance with the SAS protocol, each command is part of a connection that is opened between the SSD and a host. The SSD may carry out multiple open connections with multiple respective hosts simultaneously.

In some embodiments, SSD controller 40 comprises a hardware-implemented front-end (H/W FE) 52, and a front-end Central Processing Unit (CPU) 56. Typically, H/W FE 52 receives the memory access commands from PHY 36 and executes the commands using Direct Memory Access (DMA) in memory devices 48. CPU 56 configures the H/W FE appropriately, for example configures suitable DMA connection contexts for processing the connections that are currently active between the SSD and the hosts.

Some of the elements of SSD 24, such as PHY 36 and H/W FE 52, are implemented in hardware. Other elements of SSD 24, such as CPU 56, are implemented using a microprocessor that runs suitable software. In some embodiments, CPU 56 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

The configuration of FIG. 1 is an exemplary system configuration, which is shown purely for the sake of conceptual clarity. Any other suitable data storage system configuration can also be used. Elements that are not necessary for understanding the principles of the present invention have been omitted from the figure for clarity. H/W FE 52 and CPU 56 (or any other suitable SSD controller configurations) are sometimes referred to collectively as storage circuitry that carries out the disclosed techniques.

In the example system configuration shown in FIG. 1, memory devices 48 and SSD controller 40 are implemented as separate Integrated Circuits (ICs). In alternative embodiments, however, the memory devices and the SSD controller may be integrated on separate semiconductor dies in a single Multi-Chip Package (MCP) or System on Chip (SoC), and may be interconnected by an internal bus. Further alternatively, some or all of the SSD circuitry may reside on the same die on which one or more of the memory devices are disposed. Further alternatively, some or all of the functionality of SSD controller 40 can be implemented in software and carried out by hosts 28. In some embodiments, a host 28 and SSD controller 40 may be fabricated on the same die, or on separate dies in the same device package.

Efficient Configuration of Connection Contexts

As noted above, each SAS storage command is part of a connection that is opened between the SSD and a certain host. The SSD may close a connection, for example, when a transaction is completed or when no storage commands associated with the connection are received for a certain time period. The SSD may handle multiple open connections with multiple respective hosts simultaneously.

For example, after receiving multiple write commands from multiple hosts, the SSD may respond by sending multiple "transfer ready" (XFER_READY) messages to the multiple hosts, indicating that the SSD is ready to receive the data transfer of the multiple write commands. The data of the various write commands may arrive at the SSD in any order, for example in successive order, out-of-order or in an interleaved manner.

In some embodiments, SSD controller 40 defines a respective context for each connection. The context defines the state of the connection by specifying operational parameters such as, for example, the type of storage command being executed, the current offset of the data being transferred relative to the beginning of the data, a memory address in which the transferred data is to be stored or buffered, received data and command buffers, tag tables, end-to-end protection state variables, encryption/decryption state variables, compression state variables, and/or any other suitable parameters related to the connection.

Typically, H/W FE 52 executes storage commands purely in hardware using DMA, without involving CPU 56. In order for H/W FE 52 to execute storage commands on a given connection, CPU 56 configures the H/W FE with the connection context (also referred to as a DMA context, or simply context for brevity). When the H/W FE prepares to switch to a context that is not currently configured in the hardware, CPU 56 typically stores the state of the previous context, retrieves the state of the new context and configures the new context in the H/W FE.

It is possible in principle for CPU 56 to re-configure H/W FE 52 with the appropriate connection context on reception of each storage command. This sort of solution, however, incurs considerable latency overhead. The latency overhead of this solution is especially severe when the SSD receives data on multiple connections in an interleaved manner. In such a scenario, CPU 56 would have to repeatedly re-configure H/W FE 52 to alternate from one connection context to another.

Thus, in some embodiments CPU 56 pre-configures H/W FE 52 with multiple contexts of multiple respective connections. The H/W FE in these embodiments may comprise multiple context caches for storing the parameters of the various pre-configured connections. When receiving a storage command belonging to one of the pre-configured connections, the H/W FE is able to execute the command using the pre-configured context of this connection without involving CPU 56. H/W FE 52 may be designed to support any desired number of pre-configured connection context, such as two, four or eight contexts.

In some embodiments, if H/W FE 52 identifies that a certain received storage command belongs to a connection whose context is not pre-configured therein, the H/W FE triggers the software of CPU 56 to configure this context so as to be able to execute the command. The H/W FE may trigger the CPU software in any suitable way, for example by issuing an interrupt to the CPU. After configuring the new context, H/W FE may execute the storage command using this context.

Typically, the newly-configured context overwrites one of the previously-configured contexts in H/W FE 52, since the number of configured contexts in the H/W FE is limited. CPU 56 and/or H/W FE 52 may decide which previously-configured context to overwrite using any suitable criterion.

The above-described technique enables SSD controller 40 to handle various multiple-connection scenarios efficiently. For example, when the storage commands belong to a small number of connections (less than the number of connections that can be configured simultaneously in H/W FE 52), the H/W FE executes the commands with high throughput without a need for any configuration on the part of CPU 56. When the storage commands arrive in order, i.e., one connection after another without interleaving, the H/W FE is able to execute the commands with little or no configuration overhead on the CPU. In these scenarios, the CPU is invoked mainly upon completion of transactions and for handling error events.

On the other hand, when the storage commands of different connections arrive in an interleaved manner, or if a command for a new connection arrives, the connection context is configured in the H/W FE by the CPU software. In this manner, the hardware size in the H/W FE is kept manageable, and at the same time there is no limit on the maximum number of connections that can be supported simultaneously. Different trade-offs of latency (and thus throughput) vs. hardware complexity can be accommodated by increasing or decreasing the number of hardware-implemented context caches in H/W FE 52.

Figure 2:
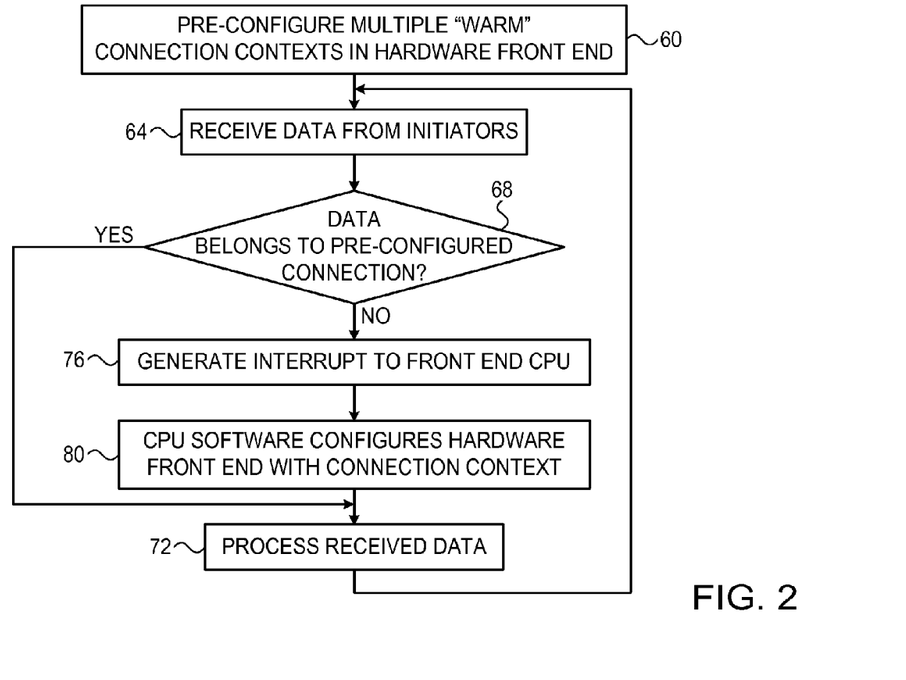
FIGS. 2 and 3 are flow charts that schematically illustrate methods for configuring connections, in accordance with embodiments of the present invention.

FIG. 2 is a flow chart that schematically illustrates a method for configuring connections in SSD controller 40 of SSD 24, in accordance with an embodiment of the present invention. The method begins with the software of CPU 56 pre-configuring H/W FE 52 with multiple connection contexts, at a pre-configuration step 60.

SSD controller 40 receives data associated with a storage command from a certain host (initiator) 28, at a data input step 64. The data is provided to H/W FE 52. The H/W FE checks whether the data belongs to one of the connections whose contexts are currently configured in the H/W FE, at a connection checking step 68.

If the connection context is already configured, H/W FE 52 processes the data (e.g., stores the data in memory devices 48) in accordance with the context, at a processing step 72. If the connection context is not configured, H/W FE 52 generates an interrupt to CPU 56, at a CPU triggering step 76. In response to the interrupt, the software of CPU 56 configures H/W FE 52 with the appropriate connection context, at a configuration step 80. As noted above, CPU 56 typically stores the state of an existing context that is to be overridden by the new context, retrieves the state of the new context and configures the new context in H/W FE 52. The method then proceeds to step 72 for processing the data.

Hardware Caching of Most Recently Closed Connection, and Fast Connection Re-Opening In many practical scenarios, the storage commands received in SSD 24 are associated with a relatively small number of connections. In other scenarios, a certain connection is closed following an inactivity period on the connection, and then an additional storage command of the same connection arrives. In such scenarios, as well as in others, the storage performance (e.g., latency and throughput) can be improved by caching the most recently used connection contexts in hardware. By using the connection contexts that are cached in hardware, the SSD controller is able to re-open a recently-closed connection immediately and with small overhead, without involving the CPU software.

In some embodiments, H/W FE 52 opens one or more connections, executes storage commands that are associated with the open connections, and closes the connections after executing the commands. The H/W FE caches the contexts of one or more of the connections that were most recently closed. When a subsequent storage command belonging to a closed connection arrives, the H/W FE checks whether the connection is one of the most-recently-closed connections whose contexts are cached. If so, the H/W FE re-opens the connection using the cached context and executes the command. Depending on hardware complexity, any suitable number of connection contexts can be cached in H/W FE 52.

Figure 3:
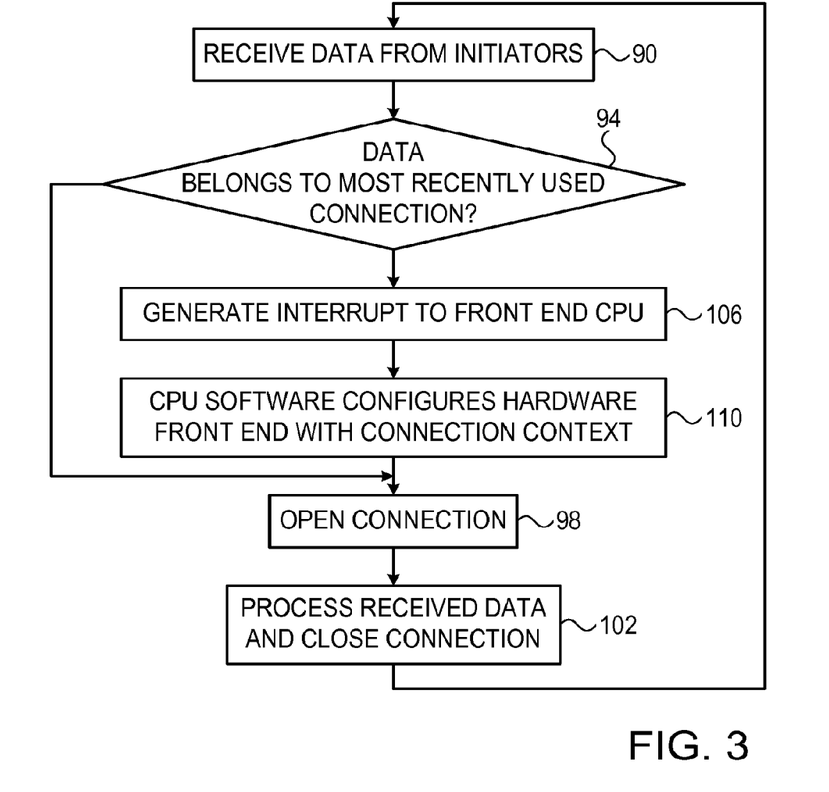

FIG. 3 is a flow chart that schematically illustrates a method for configuring connections, in accordance with an embodiment of the present invention. This example refers to caching of a single most-recently used context. Caching of multiple contexts can be implemented in a similar manner.

The method begins with SSD controller 40 receiving data from one or more hosts (initiators) 28, at a data reception step 90. H/W FE 52 checks whether the data belongs to the most-recently-closed connection, at a recent connection checking step 94.

If so, the H/W FE re-opens the connection using the hardware-cached context, at a connection re-opening step 98. The connection re-opening in this case is performed solely in hardware without involving the CPU. Otherwise, H/W FE 52 issues an interrupt to CPU 56, at an interrupt generation step 106. In response to the interrupt, the software of CPU 56 configures H/W FE 52 with the connection context, at a context configuration step 110. As noted above, CPU 56 typically stores the state of the existing context for later use, retrieves the state of the new context and configures the new context in H/W FE 52. The H/W FE then opens the connection at step 98.

H/W FE 52 executes the storage command using the applicable context and closes the connection, at an execution step 102.

Compensation for Temporary Data Under-Run Using Data Prefetching

In accordance with the SAS specifications, no pauses or gaps are permitted during Information Unit (IU) transfer. Once the SAS transport layer begins transmission of a frame, the data words of the IU should be provided in successive time slots with no gaps or interruptions (with only ALIGNp—a delete-able primitive—possibly inserted).

In practice, gaps in the data transfer of an IU from the SSD (target) to a host (initiator) may be created for several reasons, for example when a data under-run occurs between fetching the data for from memory and transfer of the data over the storage interface. When a gap is created, the frame will typically contain invalid data and its transfer is likely to fail (e.g., cause Cyclic redundancy Check—CRC—failure).

In the context of the present patent application and in the claims, the term "data under-run" refers to any scenario in which the storage device circuitry (e.g., SSD controller) is unable to fetch data from memory with sufficient speed or bandwidth, so as to allow the data to be transferred without gaps at the clock speed of the storage interface. Data under-runs are often temporary in nature, and may occur for various reasons, for example due to bus congestion, temporary management or other processing load, or for any other reason.

In some embodiments, when transferring data from SSD 24 to a host, H/W FE 52 of the SSD prefetches a certain amount of data from memory in order to avoid potential gaps in the data. The data size to be prefetched from memory (sometimes referred to as prefetch depth) has an impact on performance: An exceedingly high prefetched data size causes an unnecessary increase in latency. Setting the prefetch depth too low, on the other hand, may increase the probability of creating gaps and thus causing transfer errors and retransmission.

Thus, in some embodiments SSD controller 40 of SSD sets the data size to be prefetched at an optimal value that is based on the expected data under-run. This setting is able to optimize the trade-off between error performance and latency.

Figure 4:
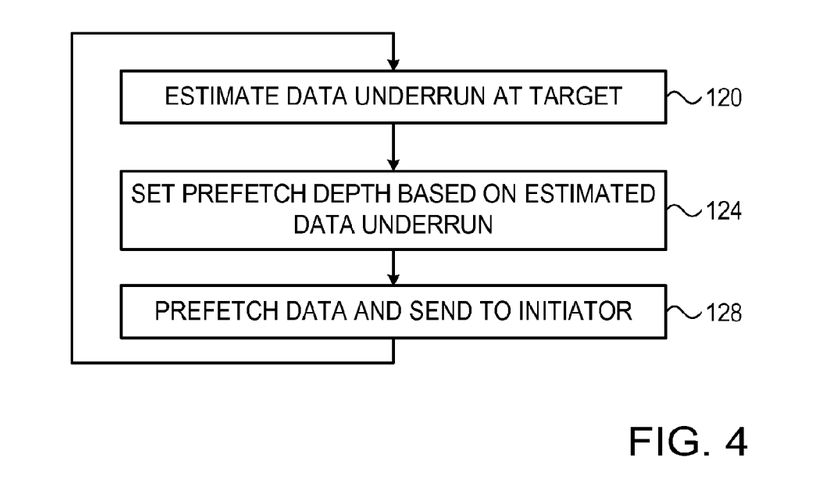
FIG. 4 is a flow chart that schematically illustrates a method for data transmission, in accordance with an embodiment of the present invention.

FIG. 4 is a flow chart that schematically illustrates a method for SAS data transmission, in accordance with an embodiment of the present invention. The method begins with SSD controller 40 estimating the temporary data under-run of the SAS interface, at an under-run estimation step 120. The SSD controller may estimate the under-run in various ways. For example, the probability of encountering an under-run may be estimated based on the statistical properties (e.g., histogram) of the latency of fetching data from memory devices 48. The latency may be estimated, for example, using off-line characterization or on-line measurements.

SSD controller 40 sets the data size to be prefetched from memory devices 48 based on the estimated data under-run, at a prefetch depth setting step 124. The data size is calculated so as to enable uninterrupted completion of storage command execution (e.g., data transfer to the host).

In an example embodiment, the prefetch depth is set based on the histogram of the data fetching latency described above. For example, the SSD controller may set the prefetch depth such that the probability of causing data under-run in an IU does not exceed a specified probability threshold (e.g., 99.9%, 99.99% or any other suitable threshold value). In addition to the estimated data under-run, the prefetched data size may depend, for example, on the total length of the data (e.g., IU size).

When executing storage commands, e.g., when transferring data from memory devices 48 to a host, SSD controller 40 prefetches data from the memory devices according to the data size set above, at a prefetching step 128.

In some embodiments, the SSD controller sets the prefetch depth depending on the type of memory from which the data is retrieved. In an example embodiment, data prefetching may be deactivated altogether for one type of memory, and activated for another memory type. For example, data prefetching may be activated when the data is retrieved from internal Read Access Memory (RAM), and deactivated when the data is retrieved from external shared Double Data Rate (DDR) memory.

In some embodiments, the optimal setting of prefetch depth does not guarantee error-free data transfer. In other words, even with optimal prefetch depth setting, there remains some finite probability that a gap will be created due to data under-run. In such a case, the frame CRC will typically fail and the frame will be retransmitted.

Detection of Duplicate Tags Using Hash Table

In accordance with the SSD protocol, each connection for a SAS command or task is assigned an initiator tag. The tag field comprises 16 bits, i.e., it is able to support a total of 65536 64-bit tag values per initiator-target pair. In practice, however, no more than 256 different tags are typically active at any given time. The tags are required to be unique at any given time. In other words, it is not permitted for two connections that are active at the same time to be assigned the same tag. An event of this sort is referred to as a duplicate tag, and is regarded as a severe error.

In some embodiments, SSD controller 40 carries out a process for detecting duplicate tags using a hash table data structure. The SSD controller stores in the hash table tags of currently-active connections. The table is accessed by hash values that are produced by applying a hash function to the tags extracted from received storage commands. Each entry of the hash table holds one or more tags associated with a respective hash value. When a new connection is opened, the SSD controller adds the tag of the new connection to the appropriate entry of the hash table, i.e., to the entry associated with the hash value produced from the tag assigned to the new connection. The SSD controller detects duplicate tags by comparing the tag of the new connection to the tags that are already stored in the corresponding entry of the hash table. If a match is found, the SSD controller reports an error message indicating the duplicate tag.

In the embodiments described herein, each hash table entry is limited in size to hold no more than a predefined number, N, of tag values. If, when checking the tag of a new connection, the SSD controller finds that the corresponding hash table entry is already fully-populated with N tag values, the storage device declines the new connection.

By limiting the hash table entry size to N tag values, the hash table can be kept at a manageable size. The size N can be set as a design parameter—to trade-off hash table size (and thus memory size) against probability of collision in the hash table (and thus storage performance). N may be set to any suitable entry size. At the same time, connections whose tags cannot be added to the limited-size hash table are declined, and thus duplicate tags are avoided.

The storage device may decline a connection in various ways, such as by sending a "task set full" SAS message to the host. In response to such a message, the host will typically postpone the connection setup and will retry at a later time.

Figure 5:
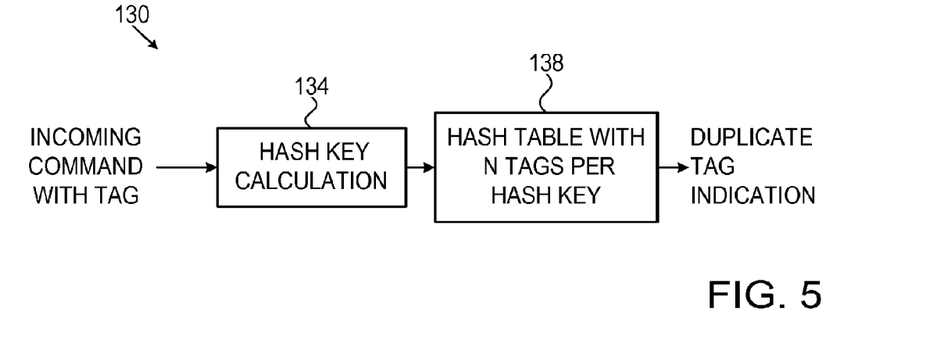
FIG. 5 is a block diagram that schematically illustrates a hash-based duplicate tag detection mechanism, in accordance with an embodiment of the present invention.

FIG. 5 is a block diagram that schematically illustrates hash-based duplicate tag detection circuitry 130, in accordance with an embodiment of the present invention. Circuitry 130 is typically implemented in SSD controller 40, for example in H/W FE 52. Alternatively, an equivalent mechanism can be implemented in software, e.g., in CPU 56, or using a combination of hardware and software elements.

Circuitry 130 comprises a hash key calculation module 134, which applies a hash function to tags extracted from incoming storage commands. For a given tag, module 134 outputs a hash key (also referred to as hash value) that was calculated over the tag by the hash function. The hash value is used as a key or index for accessing a hash table 138.

As described above, table 138 comprises multiple entries corresponding to the various hash values, and each entry is able to hold up to N tag values. Table 138 may be stored in any suitable location, such as in memory devices 48 or in an internal memory of SSD controller 40. If the tag of the incoming storage command matches one of the tag values in the hash table entry corresponding to the hash value, circuitry 138 outputs a duplicate tag error indication.

Figure 6:
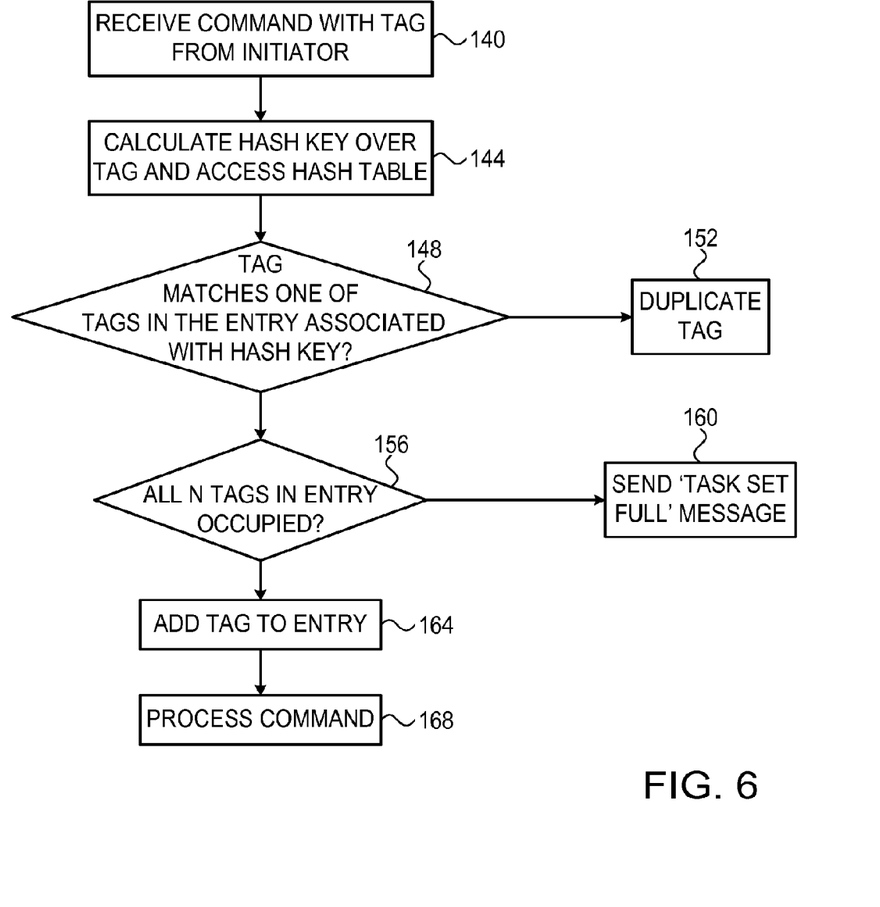
FIG. 6 is a flow chart that schematically illustrates a method for hash-based duplicate tag detection, in accordance with an embodiment of the present invention.

FIG. 6 is a flow chart that schematically illustrates a method for hash-based duplicate tag detection, in accordance with an embodiment of the present invention. The method begins with SSD controller 40 receiving a storage command from a host, at a command reception step 140. The command belongs to a new connection that is to be set-up, and comprises a tag field having a certain tag value.

Module 134 in the SSD controller calculates a hash value for the tag extracted from the command using the hash function, at a hash calculation step 144. The SSD controller looks-up hash table 138, in order to check whether the tag of the incoming command matches the tag of a currently-active connection, at a duplicate checking step 148. Typically, the SSD controller compares the tag of the incoming commands against the tag values stored in the hash table entry indexed by the hash value calculated above.

If a match is found, SSD controller 40 outputs a duplicate tag error indication, at a duplicate tag indication step 152. Otherwise, the SSD controller checks whether all N possible tag values in the hash table entry are already occupied, at an entry status checking step 156. If the entry is fully populated, there is no space to add the tag of the incoming command to the hash table. Thus, SSD controller 40 declines the new connection, at a declination step 160. The SSD controller may decline the command connection, for example by sending a SAS "task set full" message to the host.

Otherwise, SSD controller 40 adds the tag of the incoming command to the hash table entry, at a tag addition step 164, and processes the command, at a command processing step 168.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

What is claimed is:

1. A method for data storage, comprising:

in a hardware-implemented front-end of a storage device, opening at least one connection;
executing, in a memory of the storage device, commands associated with at least one connection;
closing the at least one connection after executing the commands;
caching one or more contexts of respective one or more connections that were most recently closed, wherein each context of the one or more contexts includes encryption and decryption state variables;
receiving a command associated with a given connection that is currently open;
checking the given connection against the cached contexts;
in response to identifying that the given connection is one of the one or more connections that were most recently closed, re-opening the given connection using one of the cached contexts; and executing the command in accordance with the one of the contexts.

2. The method according to claim 1, wherein the commands are received in accordance with a Serial Attached Storage (SAS) storage protocol.

3. The method according to claim 1, wherein the storage device comprises a Solid State Disk (SSD).

4. The method according to claim 3, wherein executing the commands comprises carrying out the commands without involvement of a Central Processing Unit (CPU) of the storage device.

5. A data storage apparatus, comprising:
an interface, which is arranged to communicate with one or more hosts; and
a hardware-implemented front-end, which is configured to:
open at least one connection, to execute in a memory of the apparatus storage commands associated with the at least one connection;
close the at least one connection after executing the storage commands;
cache one or more contexts of respective one or more connections that were most recently closed, wherein each context of the one or more contexts includes encryption and decryption state variables;
receive a storage command associated with a given connection that is not currently open;
check the given connection against the cached contexts;
in response to identifying that the given connection is one of the one or more connections that were most recently closed, re-open the given connection using one of the cached contexts; and
execute the storage command in accordance with the one of the cached contexts.

6. The apparatus according to claim 5, wherein the storage commands are received in accordance with a Serial Attached Storage (SAS) storage protocol.

7. The apparatus according to claim 5, wherein the interface, the hardware-implemented front-end and the memory are comprised in a Solid State Disk (SSD).

8. The apparatus according to claim 5, wherein the hardware-implemented front-end is further configured to close each connection following a predefined inactivity period on the connection.

9. The apparatus according to claim 5, wherein the hardware-implemented front-end is further configured to execute the storage commands without involvement of a Central Processing Unit (CPU) of the apparatus.

10. the method according to claim 1, wherein closing the at least one connection comprises closing each connection following a predefined inactivity period on the connection.

* * * * *